United States Patent

Dartus

[11] Patent Number: 5,938,074
[45] Date of Patent: Aug. 17, 1999

[54] METERING METHOD AND METERING DEVICE FOR POWDER MATERIALS

[75] Inventor: Yves Dartus, Clermont-Ferrand, France

[73] Assignee: Compagnie Generale des Etablissments Michelin - Michelin & Cie, Clermont-Ferrand Cedex, France

[21] Appl. No.: 08/125,122

[22] Filed: Sep. 22, 1993

[30] Foreign Application Priority Data

Apr. 2, 1993 [EP] European Pat. Off. ............. 93400853

[51] Int. Cl.$^6$ ...................................................... G01G 13/00
[52] U.S. Cl. ................................. 222/1; 222/56; 222/77; 222/55; 177/50
[58] Field of Search .................................. 222/1, 55, 56, 222/77; 177/16, 50

[56] References Cited

U.S. PATENT DOCUMENTS

| | | |
|---|---|---|
| 3,578,094 | 5/1971 | Henry ..................................... 222/55 X |
| 3,643,752 | 2/1972 | Blodgett ................................ 177/50 X |
| 4,320,855 | 3/1982 | Ricciardi et al. . |
| 4,534,429 | 8/1985 | Konishi ..................................... 177/50 |
| 4,721,173 | 1/1988 | Hirota et al. ........................... 177/50 X |
| 4,793,420 | 12/1988 | Hirano ..................................... 177/50 |
| 4,867,343 | 9/1989 | Ricciardi et al. ..................... 222/56 X |
| 4,880,142 | 11/1989 | Higuchi et al. .......................... 222/56 |

FOREIGN PATENT DOCUMENTS

| | | |
|---|---|---|
| 0095095 | 5/1983 | European Pat. Off. . |
| 2709304 | 9/1978 | Germany . |

*Primary Examiner*—Kenneth Bomberg
*Attorney, Agent, or Firm*—Baker & Botts, L.L.P.

[57] ABSTRACT

A metering device which includes a storage reservoir 3, a volumetric extractor 30 introducing roughly gauged batches of material into an intermediate hopper 4, which empties periodically into a weighing hopper 1. Under the latter, rapid stabilization scales 2 record the weight of the batch contained in the weighing hopper 1. The latter is emptied onto a belt 5 at the end of a time interval proportional to the weight of the batch or of one of the preceding batches.

11 Claims, 4 Drawing Sheets

METERING METHOD AND METERING DEVICE FOR POWDER MATERIALS

BACKGROUND OF THE INVENTION

The present invention relates to the quantitative metering of materials capable of flowing naturally, such as grained products or pulverulent products. The metering of such products, whether it be volumetric metering, or weight-based metering, has a large number of industrial applications. In some cases it is highly desirable for the metering to be carried out continuously in order to be able to incorporate the metered material in a continuous production process.

Although quantitative metering has been completely mastered for liquid phase products, the same cannot be said for products in powder form. Systems which operate by weighing are already known, such as the system described in the U.S. Pat. No. 4,320,855. Such a system comprises a reservoir containing the material to be metered, the total weight of which is continuously evaluated. A flow of material is extracted continuously from this reservoir, and knowledge of the progression in the lowering of the total weight makes it possible to regulate the output of material withdrawn from this reservoir.

Unfortunately, such a system is not sufficiently accurate. Indeed, the scales used must be capable of measuring the total weight of material contained in the reservoir. Furthermore, it is desirable to be able to measure accurately the instantaneous quantities of material withdrawn from the reservoir. Now, the quantities of materials withdrawn per unit of time represent typically a very small percentage of the total mass of material which the reservoir is capable of containing. It is known that, in metrology, it is not generally possible to achieve an accuracy of the order of one percent on a deviation which is itself only a very small percentage of the measurement range of an apparatus.

It is therefore very difficult to perform a very accurate metering of material on the basis of a method such as that described in the aforementioned U.S. Pat. No. 4,320,855. In addition, it may be noted that a high degree of accuracy will be all the more difficult to achieve in a continuous method where the output is very small: since a continuous output is desired, the flow will be divided into as small as possible unit quantities; in dynamic operation, achieving an accuracy of better than a few percent on a quantity of a few milligrams every second is problematic.

Metering devices are also known which operate according to a principle of volume measurement. Now, most of the time, the metering which must be carried out is in reality a weight-based metering, because clearly defined masses of material are mixed in order to form a product of given composition. Accordingly, volumetric metering is only an indirect approach to the weight-based metering which must in fact be performed. Consequently, it is often necessary to carry out prior packing of the material to be metered, in order to have a strictly constant density of material upstream of the volumetric metering system.

SUMMARY OF THE INVENTION

The aim of the present invention is to propose a metering method and metering device of very great accuracy, which can function with extremely small metered unit quantities, very small mean outputs, and which can function at a variable nominal output.

According to the invention, the metering method consists in continually repeating the following cycle:

(a) introducing a unit quantity of material into a weighing hopper, (b) recording the weight of the unit quantity in order to characterize one weighing, (c) removing the quantity of material contained in the weighing hopper at the end of a time interval proportional to the weight of a weighing, and as a function of the desired output.

Thus, it is seen that the invention proposes starting from a unit quantity which can be quite roughly estimated, then measuring with great accuracy said unit quantity, and restoring a flow which is continuous on average by releasing said successive unit quantities according to a sequence which depends on the measurements actually observed.

A metering device allowing this method to be carried out comprises:

a reservoir containing the material to be metered, an extractor for withdrawing in a controlled manner from the reservoir the material to be metered, an intermediate hopper receiving the material which is introduced therein by the extractor, a weighing hopper receiving the material which is introduced therein when the intermediate hopper is opened in order to empty it, weighing means giving the weight of the material contained in the weighing hopper when the intermediate hopper is closed, means triggering the following sequence of operations: opening the weighing hopper in order to empty it, then closing it after a given delay, then opening the intermediate hopper in order to transfer the contents thereof into the weighing hopper, then closing it after another given delay, means for adjusting the time interval elapsing between a given sequence and the following sequence, on the basis of the measurements from the weighing means, as a function of the desired nominal weight output.

The invention proposes using a weight-based metering technique in order to derive advantage from the greater intrinsic accuracy of this technique. In contrast to what is known in a weight-based metering system capable of operating continuously, the present invention requires the use of scales whose operational range corresponds substantially to the metered unit quantity. The invention thus makes it possible to profit fully from the great accuracy which can be achieved with scales weighing small masses. In order to achieve as continuous an operation as possible, it is important for the cycle time to be very short. In this case use is preferably made of a type of scale whose stabilization time, following a loading, is extremely short. Scales capable of weighing several grams with a weighing time of less than one second can be found on the market, the weighing time including the stabilization time of the scales prior to obtaining the measurement.

The general principle of the invention thus consists in separating the nominal flow of material which is to be supplied into successive unit quantities which are called "weighings". By virtue of the principle of regulating the periods of time separating two successive weighings, or more precisely two successive emptyings of the weighing hopper, it is possible to achieve a very great accuracy in the overall output delivered by the metering system. This very great accuracy can be achieved without difficulty even if the system for continuously supplying the weighing hopper is itself very inaccurate. The time between the removal of one weighing and that of the preceding weighing is proportional to the weight of the last weighing or, alternatively, proportional to the weight recorded in memory during the weighing carried out on one of the cycles preceding the cycle in progress. Said time is, for example, proportional to the weight of the preceding weighing, as is the case in the example discussed in detail hereinbelow.

DESCRIPTION OF THE DRAWINGS

The invention is illustrated by means of the four figures which follow and in which.

DESCRIPTION OF PREFERRED EMBODIMENTS

Figure 1:
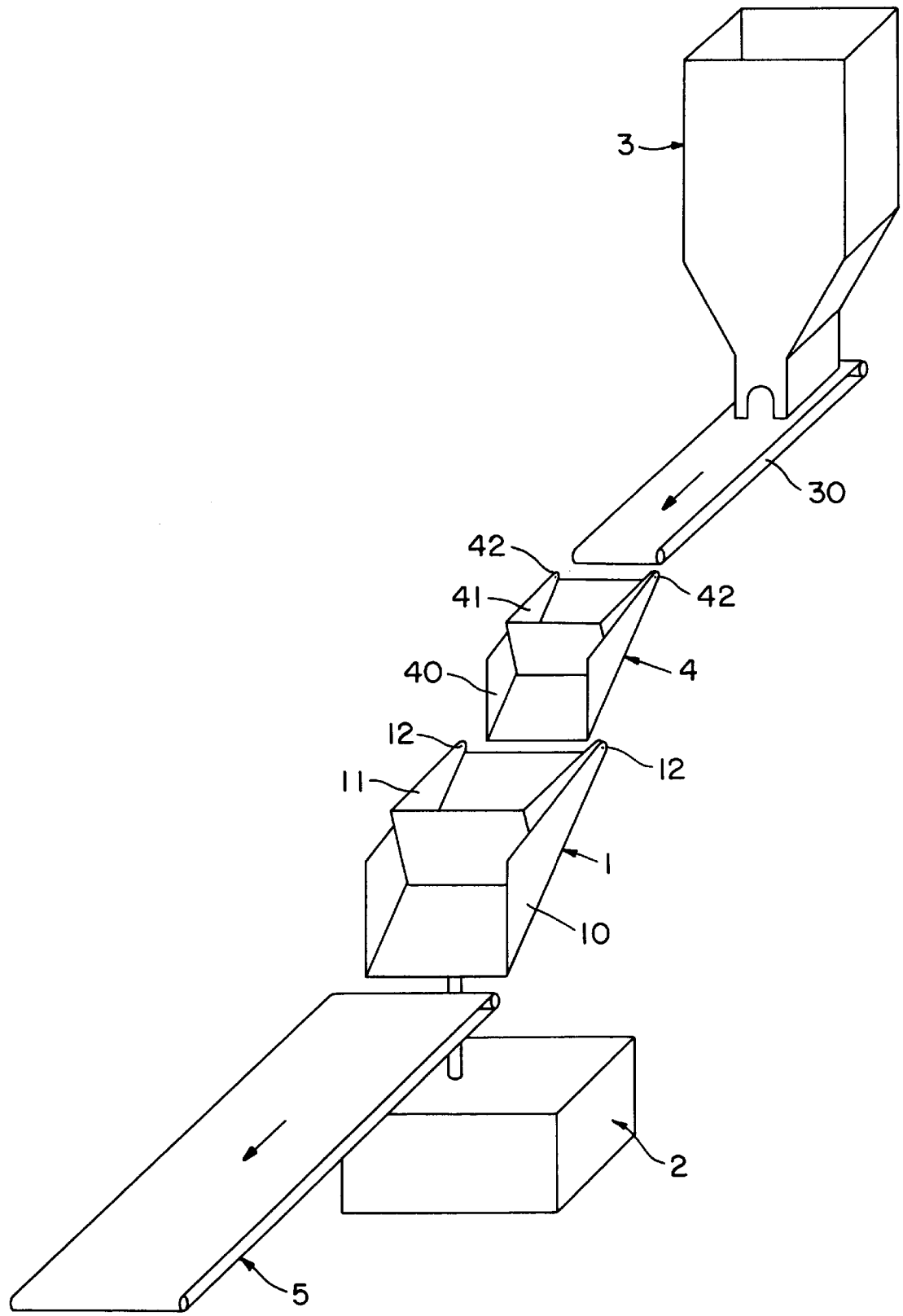
FIG. 1 represents a general perspective view of a metering device according to the invention.

The diagrammatic view in FIG. 1 provides an overall impression permitting a full understanding of the principle of the invention. The heart of the metering installation consists of the weighing hopper 1 and rapid scales 2. The weighing hopper comprises a fixed wall 10 and a movable wall 11 articulated about the axis 12. The material to be metered is stored in a reservoir 3.

Figure 2:
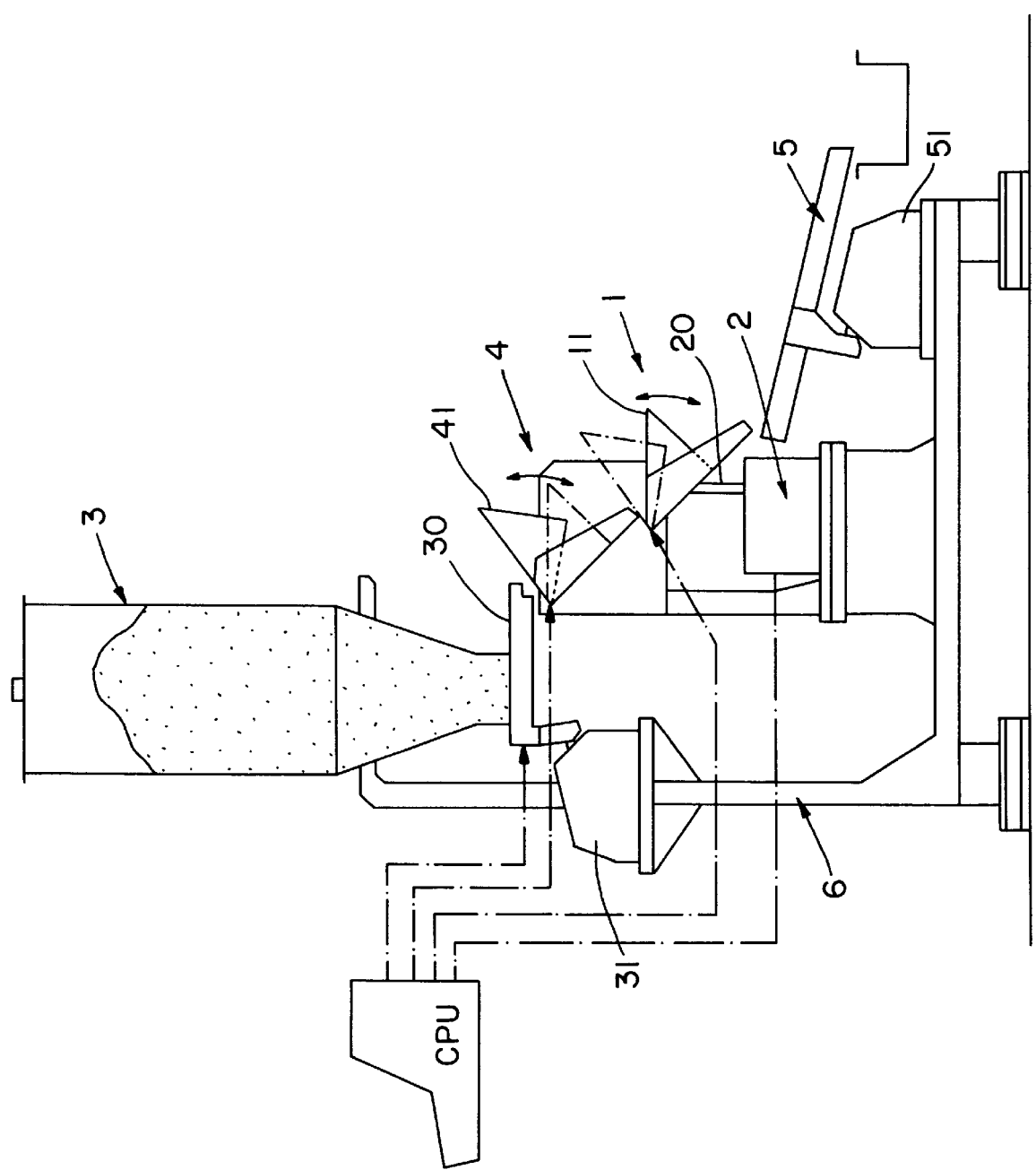
FIG. 2 represents a more detailed elevation of the same device.

An extractor 30 allows material to be brought into the intermediate hopper 4, designed in the same way as the weighing hopper 1 with a fixed wall 40 forming an inclined plane edged with flanges, on which the material can slide, and with a movable wall 41, articulated about the axis 42, capable of stopping the material as it slides over the inclined plane formed by the fixed wall 40. Finally, the device comprises a removal member such as a vibrating belt 5 (FIG. 1) or an inclined vibrating ramp 5' (FIG. 2).

Each hopper 1 or 4 is opened by tilting sufficiently its movable wall 11 or 41. In FIG. 2 the full lines represent the intermediate hopper 4 open, and the weighing hopper 1 closed, and in a phantom view the intermediate hopper 4 closed and the weighing hopper open. Also shown in this same FIG. 2 are the unit 31 controlling the extractor 30, the unit 51 controlling the removal member 5, and a structure 6 for supporting the various members of the metering device.

Figure 3:
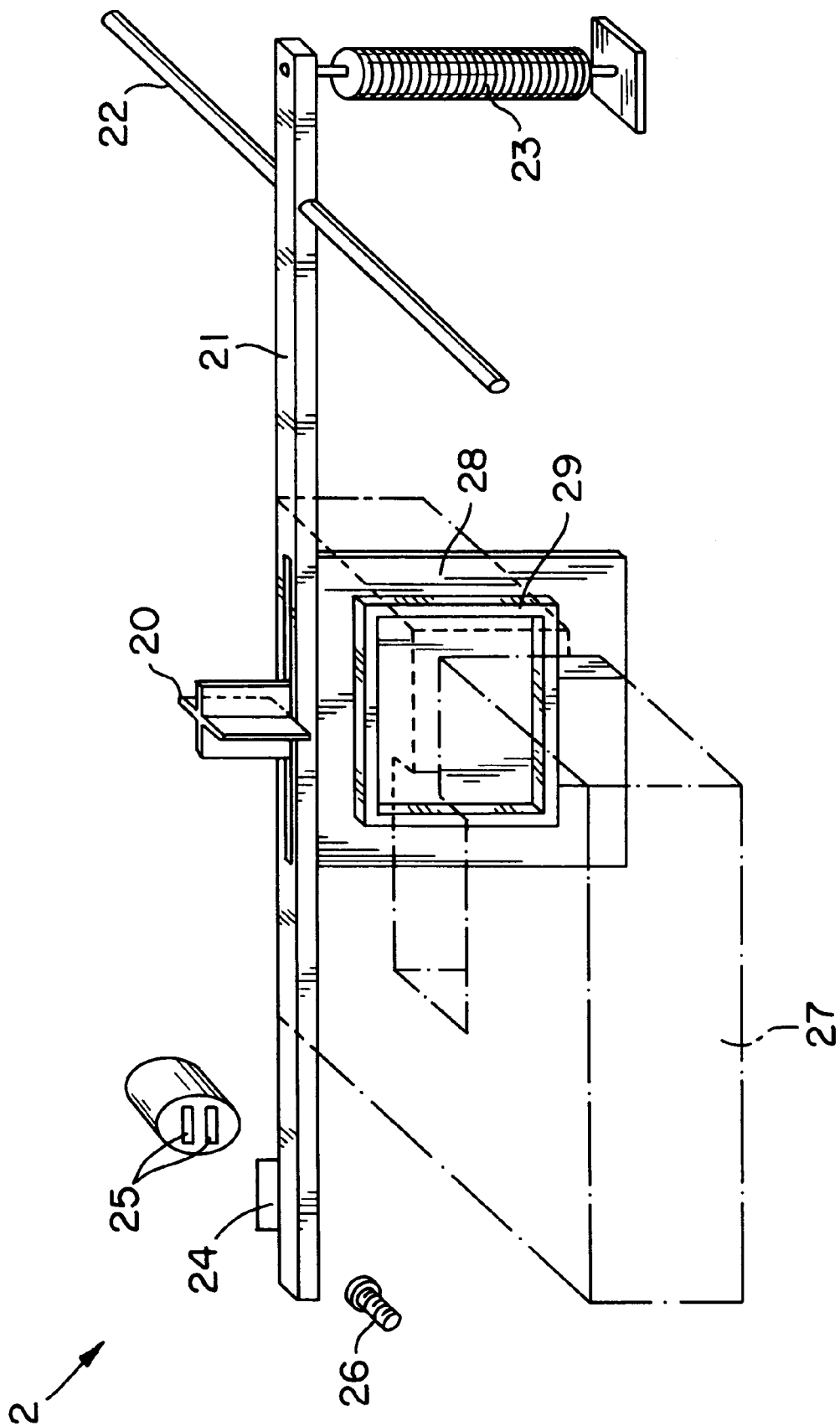
FIG. 3 represents a detailed view of one of the components of the metering device.

FIG. 3 illustrates the design of the rapid stabilization scales 2. A rod 20 is connected on the one hand to the fixed wall 10 of the weighing hopper 1 and on the other hand to the balance arm 21 of the scales. With the scales at zero, the rod 20 is oriented vertically in order to apply the weight on the balance arm without any component oriented in the direction of the balance arm 21.

The balance arm 21 supports a winding 29 mounted on a plate 28. The balance arm can turn about an axle 22, and its dead weight together with the tare of the weighing hopper 1 is compensated by a tare spring 23. The winding 29 is situated in the air gap of a permanent magnet 27. A zero detector is formed by a plate 24 integral with the balance arm 21, a lamp 26 and two photodiodes 25 mounted in bridge configuration. At zero there is no light on the two photodiodes 25 and the bridge is at equilibrium. When a load in the weighing hopper 1 causes the balance arm to drop, the small resulting movement is detected by an increase in the light which it produces on one of the two photodiodes 25, and the difference in resistance then existing between the two photodiodes creates a voltage at the terminals of the bridge. This voltage acts on an operational amplifier, which transmits a current to the winding 29 in order to bring the balance arm 21 back to zero, and the bridge to equilibrium. The electromagnetic force therefore exactly compensates for the load in the weighing hopper 1. After calibration, the measurement of the current transmitted to the winding 29 is a measure of the weight of material contained in the weighing hopper 1.

Different variations of the metering method described hereinabove are conceivable. The introduction of material into the weighing hopper can be carried out by withdrawing successive roughly measured batches. The quantity of material in each batch is preferably regulated as a function of the mean weight of the preceding weighings, or as a function of the time interval elapsing between two successive removals of a weighing, and as a function of the desired theoretical output.

Perhaps preferable to this discontinuous method is a method in which material is withdrawn continuously from a storage reservoir, this flow is transferred, during a given time, to the weighing hopper, then this continuous flow of material is branched off in order to reintroduce it to the reservoir, during the time necessary to record the weight of material already introduced into the weighing hopper, then the quantity of material present in the weighing hopper is removed, and, as soon as the weighing hopper has been emptied of its contents, the flow of material is again transferred briefly in order to allow material to enter once more into the weighing hopper, and so on. In this case the continuously withdrawn flow is preferably regulated as a function of the mean weight of the preceding weighings or of the time interval elapsing between two successive removals of a weighing, and as a function of the desired theoretical output.

Described in greater detail hereinbelow is a metering device in which successive batches are removed from the reservoir 3, which batches are introduced one after another into the intermediate hopper 4. At each cycle the volumetric extractor 30 transfers a roughly gauged volume into the intermediate hopper 4, assumed to be closed at the start. Upon an order from the central unit (designated CPU in FIG. 2) controlling the metering system, the intermediate hopper 4 opens, and this releases the material held for the time being by the said intermediate hopper 4.

At this stage no accurate metering has been carried out. The system described has the sole purpose of dividing a flow, which should theoretically be continuous, into successive unit quantities. Each of these quantities can comprise a mass fluctuating within very wide proportions, for example + or −20%.

As soon as the intermediate hopper 4 is closed, after a delay just sufficient to allow the falling stream of material present between the intermediate hopper 4 and the weighing hopper 1 to have disappeared, and which allows the scales 2 to stabilize, the latter record the weight of the material accumulated in the weighing hopper 1.

The central unit controlling the metering device then triggers said sequence of operations (opening the weighing hopper, closing it, opening the intermediate hopper, closing it). The time interval elapsing between two sequences is calculated on the basis of the weight of material recorded during the weighing preceding that one carried out just before triggering a sequence of operations, or it could be calculated on the basis of one of the preceding weighings.

The quantity of material withdrawn by the volumetric extractor 30 is itself preferably regulated as a function of a chosen number of preceding weighings, or of a chosen number of time intervals, and by comparing these values to desired mean values.

The nominal output of the metering installation expressed in mass per unit of time is an operating parameter of this installation. On the basis of a set nominal output, and a weight measurement, it is possible to calculate the time during which a known weight quantity must be released in order to obtain a constant theoretical output. The metering device in this way releases each quantity of known mass after a time which is a function, not of this mass, but of the mass of the previously released quantity.

Figure 4:
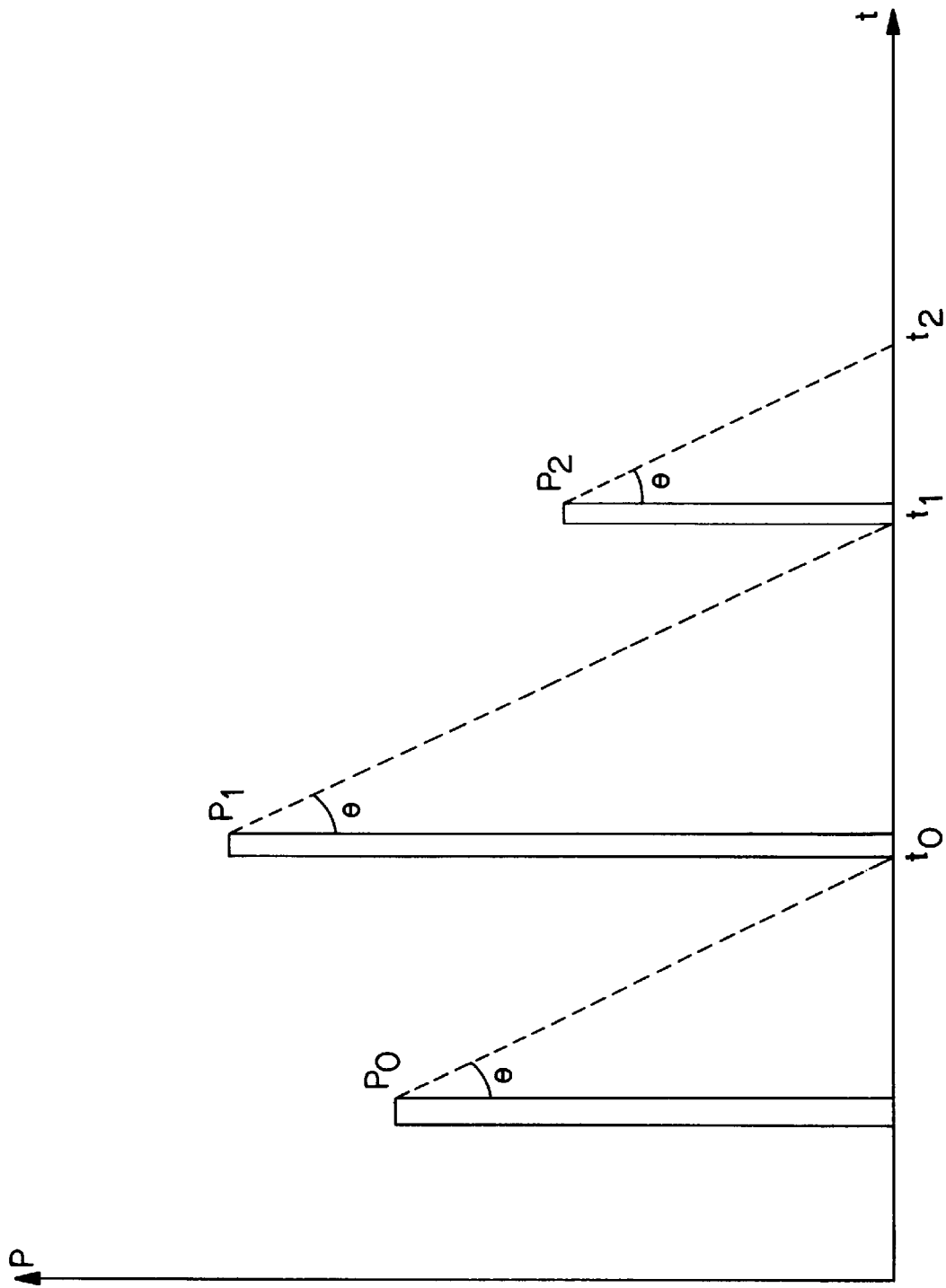
FIG. 4 shows a timing diagram of the removal of successive weighings.

Referring to FIG. 4 it will be seen that $P_0$ represents the weight of the first weighing and $P_1$ represents the weight of the second weighing, the latter is released at the end of a time interval $t_0$ which is a function of the weight of the preceding weighing $P_0$. In the same way, if $P_2$ represents the weight of the third weighing, the latter is released at the end of a time interval $t_1$ which is a function of the preceding weighing $P_1$. The straight broken lines between the top of each weighing and the base of the following weighing are of constant gradient. In this way an output (weight/time) can be readily formed which is continuous and constant overall. However, this output is pulsed since it consists of unit quantities distributed over time.

It is very easy to smooth the output discharged from the metering system formed in this way by using, for example downstream of the weighing hopper, a vibrating ramp 5' or a vibrating belt 5, which will allow each weighing to spread out along the ramp before joining up with the receding weighing to again form a substantially continuous flow of material. The time intervals can be adjusted by any suitable means, for example, by the central control unit CPU shown in FIG. 2.

The invention can have a very advantageous application in the continuous preparation of the rubber mixtures which are used in the pneumatic tire industry. It can be used in particular for performing the continuous metering of most of the chemical products used as additives in the base elastomers, since most of these can be reduced very easily into powder or granules. It can also be used to perform the continuous metering of the elastomers themselves when they have being shredded beforehand. The output ranges used can vary from a hundred grams or so per hour to several hundred kilos or so per hour.

I claim:

1. A metering device comprising:
   a reservoir containing the material to be metered,
   an extractor for withdrawing in a controlled manner from the reservoir the material to be metered,
   an intermediate hopper receiving the material which is introduced therein by the extractor,
   means for opening and closing a discharge gate from the intermediate hopper,
   a weighing hopper receiving the material which is introduced therein when the intermediate hopper is opened in order to empty it,
   means for opening and closing a discharge gate from the weighing hopper,
   weighing means giving the weight of the material contained in the weighing hopper when the discharge gates from the intermediate hopper and the weighing hopper are closed,
   programmed means triggering the following sequence of operations: opening the discharge gate from the weighing hopper in order to empty it, then closing it after a given delay, then opening the discharge gate from the intermediate hopper in order to transfer the contents thereof into the weighing hopper, then closing the discharge gate of the intermediate hopper after another given delay,
   said programmed means adjusting the time interval elapsing between a given sequence and the following sequence on the basis of the measurements from the weighing means and as a function of a desired nominal weight output.

2. The metering device as claimed in claim 1, wherein it moreover comprises means for removing the weighed material, these means being capable of effecting a smoothing of successive weighings emerging from the weighing hopper, and making it possible to deliver a substantially continuous output of material.

3. The device as claimed in claim 2, wherein the smoothing is achieved by a vibrating surface along which the material moves.

4. The device as set forth in claim 1, wherein said extractor is a volumetric extractor.

5. The device as claimed in claim 4, wherein said volumetric extractor extracts the material in successive batches introduced one after the other into the intermediate hopper.

6. The device as set forth in claim 1, wherein a time interval elapsing between said sequence and the following sequence is determined on the basis of the weight of material weighed during at least one of the weighings preceding that carried out just before the triggering of said sequence of operations.

7. A metering method in which the following cycle is continually repeated:
   introducing a unit quantity of material into a weighing hopper,
   weighing the unit quantity and retaining the weight ($P_0$, $P_1$, $P_2$) in memory, and
   removing the quantity of material contained in the weighing hopper at the end of a time interval proportional to the weight of material weighed during at least one of the preceding weighings and retained in memory and as a function ($\theta$) of a desired nominal weight output.

8. A metering method as claimed in claim 7, wherein said time interval is proportional to the weight recorded in memory during the weighing carried out on one of the cycles preceding the cycle in progress.

9. A metering method as claimed in claim 7, wherein a unit quantity of material is introduced into said weighing hopper by withdrawing the material from another hopper upstream of the weighing hopper.

10. A method as claimed in claim 9, wherein the quantity of material delivered to the weighing hopper is regulated on the basis of the weight of material weighed during at least one of the preceding weighings and as a function of the desired nominal output.

11. A method as set forth in claim 9, wherein the quantity of material delivered to the weighing hopper is regulated as a function of the time interval elapsing between two successive removals of a weighing and as a function of the desired nominal output.

* * * * *